United States Patent
Chang et al.

[11] Patent Number: 5,155,412
[45] Date of Patent: Oct. 13, 1992

[54] METHOD FOR SELECTIVELY SCALING A FIELD EMISSION ELECTRON GUN AND DEVICE FORMED THEREBY

[75] Inventors: Tai-Hon P. Chang, Chappaqua; Dieter P. Kern, Amawalk; Lawrence P. Muray, Katonah, all of N.Y.

[73] Assignee: International Business Machines Corporation, Armonk, N.Y.

[21] Appl. No.: 706,035

[22] Filed: May 28, 1991

[51] Int. Cl.$^5$ .......................... H01J 29/46; H01J 1/16; G21K 1/08
[52] U.S. Cl. ................................. 315/14; 250/396 R; 313/336
[58] Field of Search ...................... 315/382, 14, 111.81; 445/50, 51, 34; 250/423 F, 396 R, 492.3, 311; 313/336

[56] References Cited

U.S. PATENT DOCUMENTS

| | | | |
|---|---|---|---|
| 3,931,519 | 1/1976 | Coates et al. | 250/311 |
| 4,343,993 | 8/1982 | Binnig et al. | 250/423 F |
| 4,427,886 | 1/1984 | Martin et al. | 250/310 |
| 4,695,773 | 9/1987 | Veneklasen et al. | 315/382 |
| 4,814,622 | 3/1989 | Gregory et al. | 250/306 |
| 4,985,627 | 1/1991 | Gutierrez et al. | 250/306 |

OTHER PUBLICATIONS

Chang, T. H. P., et al., "Electron Optical Performance of a Scanning Tunneling Microscope Controlled Field Emission Microlens System", *J. Vac. Sci. Tech.*, B7(6):1855 (1989).

McCord, M. A., et al., "A Novel Scanning Tunneling Microscope Controlled Field Emission Microlens Electron Source", *J. Vac. Sci. Tech.*, B7(6):1851 (1989).

Fink, H. W., et al., IBM J. Res. Dev., 30(5), p. 460 (1986).

*Primary Examiner*—Gregory C. Issing
*Attorney, Agent, or Firm*—Scully, Scott, Murphy & Presser

[57] ABSTRACT

The present invention is directed to a method for selectively scaling the dimensions of a field emission electron gun. The electron gun includes a field emission tip followed by a dual electrode immersion lens. The lens consists of two planar electrodes separated by a dielectric layer. A well defined circular hole is present at the center of each electrode and the dielectric layer. A high scaling factor is applied to the region consisting of the first electrode and the emission tip, reducing the first electrode thickness and bore diameter and the distance between the tip and first electrode to the micrometer range. A weaker scaling factor is applied to the bore diameter of the second electrode and the spacing between the electrodes such that the second electrode bore diameter and distance between the electrodes are approximately equal and are greater than the first electrode thickness and bore diameter and the distance between the tip and first electrode.

14 Claims, 3 Drawing Sheets

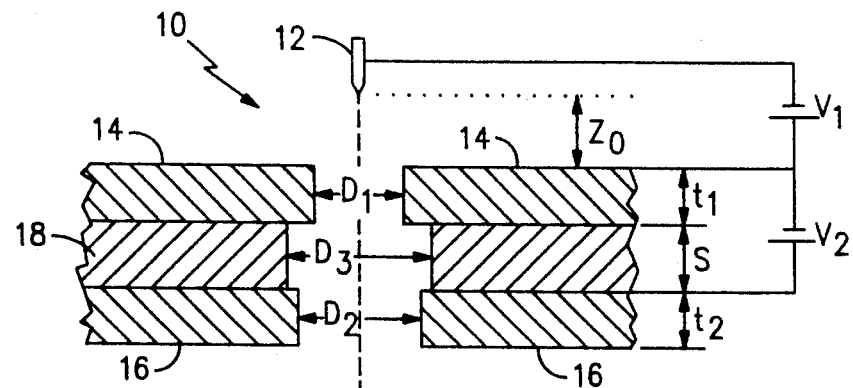
FIG.1
Prior Art
| $V_1$ | $(V_1 + V_2)$ | $D_1, t_1, Z_0$ | S | $D_2$ | $C_{so}$ | $C_{co}$ |
|---|---|---|---|---|---|---|
| 3kV | 200V | 1–3mm | 3mm | 1.5mm | 1400mm | 200mm |
| 3kV | 1kV | 1–3mm | 3mm | 1.5mm | 70mm | 20mm |
| 3kV | 10kV | 1–3mm | 9mm | 1.5mm | 10mm | 2mm |
FIG.2
Prior Art
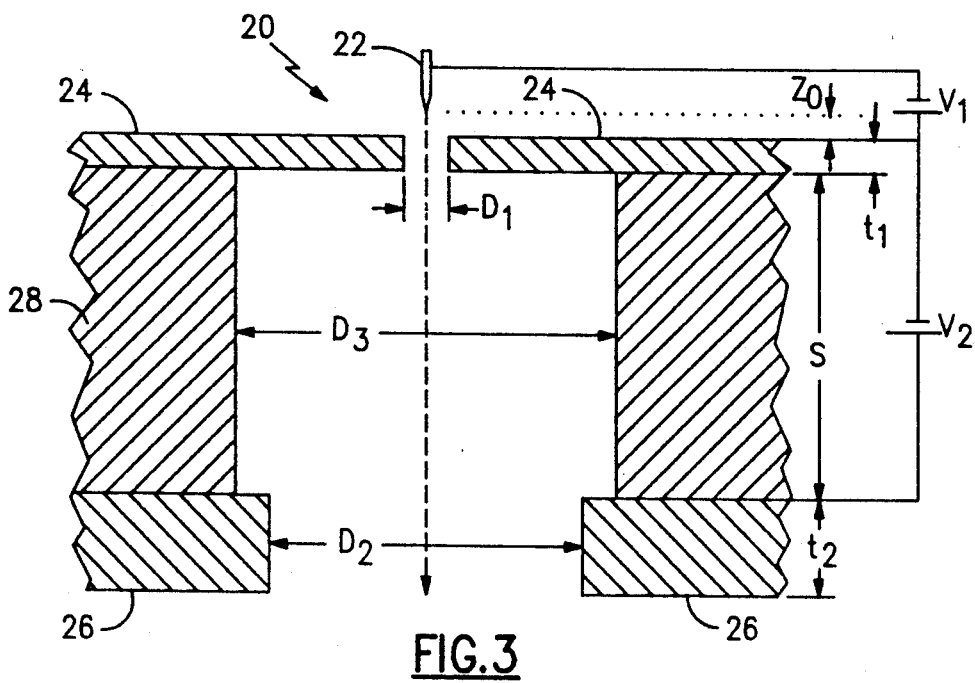
FIG.3

| $V_1$ | $(V_1 + V_2)$ | $D_1, t_1, Z_0$ | S | $D_2$ | $C_{so}$ | $C_{co}$ |
|---|---|---|---|---|---|---|
| 100V | 200V | ≃1μm | 10μm | 10μm | 0.3μm | 0.3μm |
| 100V | 1kV | ≃1μm | 100μm | 100μm | 3.5μm | 3.7μm |
| 100V | 10kV | ≃1μm | 1000μm | 1000μm | 9.4μm | 9.0μm |

METHOD FOR SELECTIVELY SCALING A FIELD EMISSION ELECTRON GUN AND DEVICE FORMED THEREBY

BACKGROUND OF THE INVENTION

1. Field of the Invention

The present invention relates generally to field emission electron sources, and more particularly, to a field emission electron gun wherein the effective brightness over a wide range of potentials is greatly improved by utilizing a selective scaling method.

2. Description of the Prior Art

A field emission electron source offers the highest brightness of all electron sources for a given potential. One example of such a source is a field emission electron gun. Field emission electron guns are widely used in electron microscopes and other electron optical systems. FIG. 1 is a cross-sectional view of a portion of a conventional field emission electron gun 10. Field emission electron guns are well known in the art and thus, only that portion of conventional field emission electron gun 10 which is needed to understand the problems with conventional electron guns is shown in FIG. 1. A more detailed description of a conventional prior art electron gun is shown, for example, in U.S. Pat. No. 3,931,519, which patent is hereby incorporated by reference. The electron gun 10 includes a field emission tip 12, a first planar electrode 14 having a thickness $t_1$ and a second planar electrode 16 having a thickness $t_2$. The distance between the tip 12 and first electrode 14 is represented by $Z_o$ and the distance between the electrodes is represented by S. Electrode 14 is separated from electrode 16 by dielectric layer 18. The combination of the first electrode, dielectric layer and second electrode is also referred to as a dual-electrode immersion lens. A well defined and accurately aligned circular hole is present at the center of each electrode and the dielectric layer to allow for the passage of electrons. The diameter of the circular hole in electrode 14 is indicated by $D_1$ and the diameter of the circular hole in electrode 16 is indicated by $D_2$. To provide for proper lens action, the diameter of the circular hole in the dielectric layer $D_3$ is larger than the bore diameter $D_1$ of the first electrode and the bore diameter $D_2$ of the second electrode.

In operation of the conventional field emission electron gun 10, an extraction potential, $V_1$, in the order of one to a few thousand volts is applied between the tip 12 and the first electrode 14 to cause field emission to take place and an additional potential, $V_2$, applied between the two electrodes accelerates the electrons to their final potential $(V_1+V_2)$ and also creates a lens action forming a real or virtual image of the electron beam emitted from the tip.

The performance of a field emission electron gun measured in brightness can be improved by reducing the lens aberrations. The three main aberrations are diffraction, spherical and chromatic aberration. The last two are related to the geometry of the lens and can, therefore, be reduced by scaling down the physical dimensions of the lens. Thus, in designing a field emission electron gun, it is desirable to optimize the dimensions of the lens and the distance between the tip and first electrode to achieve the lowest possible values for the lens aberrations. However, two practical constraints need to be considered before miniaturizing the lens dimensions. First, the bore diameter of the electrode cannot be reduced to much less than 1 μm in order to be compatible with the tolerance of the microfabrication techniques presently available. Second, the electric field between the electrodes must be restricted to a value not exceeding $10^4$ V/mm to avoid breakdown.

In a conventional field emission gun, the optimum lens dimensions are set by the high degree of accuracy required, especially in the definition of the circular hole, tip position and the tolerances of the mechanical fabrication processes employed. The typical dimensions and computed aberration coefficients (referenced to the object space) of the optimized conventional field emission gun 10 for operation at 200 V, 1 kV and 10 kV are shown in FIG. 2. It should be pointed out that, apart from the spacing between the electrodes S which varies with the value of $V_2$ applied, the values of the electrode bore diameters $D_1$ and $D_2$, electrode thicknesses $t_1$ and $t_2$ and tip to first electrode spacing $Z_o$ are typical for guns at other potentials. As can be seen from FIG. 2 these values are generally limited by the considerations discussed above to the millimeter range. In addition, the values of the coefficients of spherical aberration ($C_{so}$) and chromatic aberration ($C_{co}$) are also in the millimeter range.

The distance between the tip and first electrode can be reduced to the micron range by the use of a scanning tunneling microscope (STM) which also makes the use of a lens with electrode diameter in the micron range (microlens) feasible. This lead to the development of a STM controlled field emission tip in conjunction with a microlens to form a STM-aligned field emission (SAFE) microsource which can provide a significant improvement in emission stability and brightness.

The basic concept of the SAFE microsource is to utilize the STM feedback principle for precision x, y and z alignment of a field emission tip to a microlens to form a microsource which can be used by itself or in conjunction with another microlens to form a focused probe of electrons. The microlenses can be made using many of the standard integrated circuit fabrication techniques on silicon or other substrates with dimensions reduced to micrometer scale. As the lens aberrations generally scale with lens dimensions, such lenses can be designed to have aberrations which are 2 to 3 orders of magnitude less than a conventional field emission source. The reduction in lens aberrations results in 2 to 3 orders of magnitude improvement in brightness compared to conventional field emission sources at the same potential.

For a field emission electron gun consisting of a tip and a two-electrode immersion lens, conventional scaling requires that the lens dimensions ($D_1$, $D_2$, S) and the tip spacing $Z_o$ be uniformly reduced by the same scaling factor, k, from a conventional design to achieve a reduction of approximately the same factor k for the aberrations as shown by the SAFE microsource. However, this increases the electric field between the electrodes by a factor equal to the inverse of k, and for a small k value, the field can exceed the voltage breakdown threshold of $10^4$ V/mm rendering the dimensions of the scaled emission gun impractical. Since conventional lenses are designed fairly close to this field strength limit, very little room is left for scaling. This limitation also applies to the immersion lens in the SAFE microsource and prevents the SAFE microsource from operating and increasing brightness over a wide range of potentials. Thus, there is a need to develop a scaling method which will allow a field emission electron gun to operate and maintain low aberrations over a wide range of potentials and be compatible with voltage breakdown and electrode bore diameter constraints.

SUMMARY OF THE INVENTION

The present invention is directed to a selective scaling method which improves the brightness of a field emission electron gun over a wide range of potentials. The field emission electron gun of the present invention consists of a field emission tip followed by a dual-electrode immersion lens. The immersion lens consists of two planar electrodes separated by a dielectric layer. A well defined and accurately aligned circular hole is present at the center of each electrode and the dielectric layer. In operation an extraction potential, $V_1$, is applied between the tip and the first electrode to cause field emission to take place and an additional potential, $V_2$, is applied between the two electrodes to accelerate the electrons to their final potential ($V_1 + V_2$) and also create a lens action forming a real or virtual image of the electron beam emitted from the tip.

The performance of an electron gun measured in brightness can be improved by reducing the lens aberrations. Since lens aberrations scale with the physical dimensions of the lens, improved performance can be achieved by scaling the dimensions of the electrodes. However, in reducing lens geometry there are two practical constraints which must be considered. The electric field between the electrodes cannot exceed $10^4$ V/mm and the bore diameters of the lens should not be reduced to much less than 1 $\mu$m. The latter constraint is imposed because presently available microfabrication techniques cannot accurately fabricate bore diameters of much less than 1 $\mu$m.

In the method of the present invention a non-uniform scaling approach is applied to two regions of the electron gun. A high reduction factor is applied to the region consisting of the first electrode and the emission tip reducing the first electrode thickness and bore diameter and the tip spacing to the micrometer range. A relatively weaker reduction factor is applied to the second electrode, reducing the second electrode bore diameter and electrode spacing. The actual scaling value used for the electrode spacing can be tailored such that it does not exceed the constraint on electric field strength between the electrodes.

The use of the method of the present invention results in an improvement in aberration coefficients (spherical and chromatic) of approximately three orders of magnitude from a conventional source. The reduced aberrations lead to a corresponding improvement in the effective brightness by two to three orders of magnitude over a conventional source. In addition, the method of the present invention achieves a reduction in lens dimensions and corresponding improvement in effective brightness over a wide range of potentials while remaining within the practical constraints on bore diameter and field strength.

A technique for fabricating the electron gun of the present invention is also disclosed. The field emission tip can be prepared by a conventional DC electrochemical etch followed by annealing to remove surface oxides. Alternatively, the tip, after etching, can be processed by a combination of thermal annealing and field evaporation in the presence of either helium or neon gas. The electrodes of the microlens can be fabricated from a thin self supporting metallic film or a boron doped silicon membrane. Precise circular holes are prepared in the membranes by first patterning and then subsequently etching. The thickness of the electrode is fabricated by etching the backside of the membrane.

BRIEF DESCRIPTION OF THE DRAWINGS

FIG. 1 is a cross-sectional view of a portion of a prior art field emission electron gun.

FIG. 2 is a table of lens dimensions and aberration coefficients of the prior art field emission source of FIG. 1 at three potentials.

FIG. 3 is a cross-sectional view of a portion of a field emission electron gun which utilizes a selective scaling method in accordance with the present invention.

DETAILED DESCRIPTION OF THE INVENTION

Figures 4, 5:
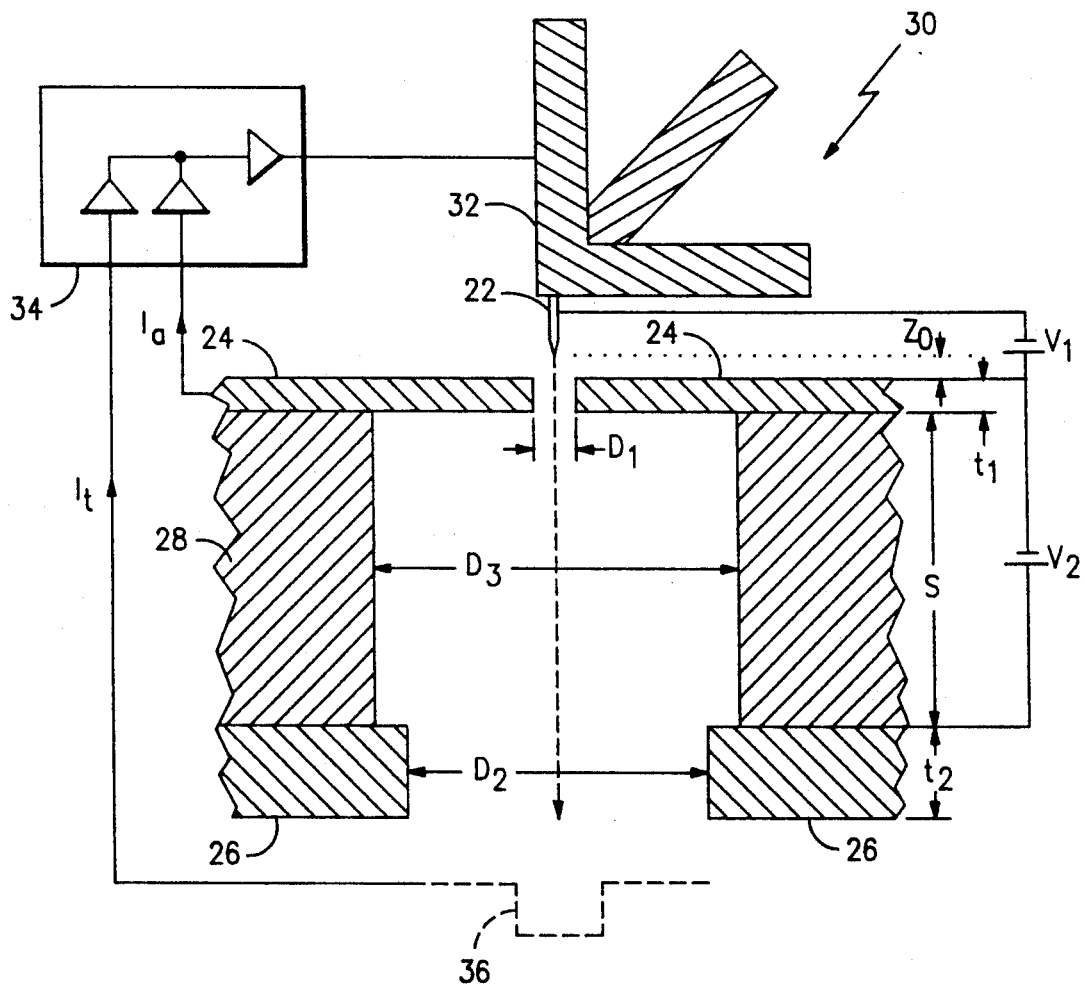
FIG. 4 is a cross-sectional view of the field emission electron gun in FIG. 3 which also utilizes a STM to produce a SAFE microsource.
FIG. 5 is a table of lens dimensions and aberration coefficients of the field emission electron gun in FIG. 4 at three potentials.

FIG. 3 is a cross-sectional view of a portion of a field emission electron gun 20 which utilizes a selective scaling method in accordance with the present invention. Field emission electron guns are well known in the art and thus, only that portion of the field emission electron gun 20 which is necessary to understand and implement the present invention is shown in FIG. 3. The present invention can be implemented, for example, in the electron gun shown in U.S. Pat. No. 3,931,519. The electron gun 20 includes a field emission tip 22, a first planar electrode 24 having a thickness $t_1$ and a second planar electrode 26 having a thickness $t_2$. The distance between the tip 22 and first electrode 24 is represented by $Z_o$ and the distance between the electrodes is represented by S. Electrode 24 is separated from electrode 26 by dielectric layer 28. The structure consisting of the first electrode 24, dielectric layer 28 and second electrode 26 is referred to as a dual-electrode immersion lens. A well defined and accurately aligned circular hole is present at the center of each electrode and the dielectric layer to allow for the passage of electrons. The diameter of the circular hole in electrode 24 is indicated by $D_1$ and the diameter of the circular hole in electrode 26 is indicated by $D_2$. To provide for proper lens action, the diameter of the circular hole in the dielectric layer $D_3$ is larger than the bore diameter $D_2$ of the second electrode.

FIG. 3 also shows an extraction potential, $V_1$, on the order of one to a few hundred volts applied between the tip 22 and first electrode 24 and an additional potential, $V_2$, applied between the two electrodes. In operation, $V_1$ causes field emission to take place and $V_2$ accelerates the electrons to their final potential ($V_1 + V_2$) and also creates a lens action forming a real or virtual image of the electron beam emitted from the tip. This image is known as the "effective source", and its size is determined in part by the magnification of the immersion lens which is dependent on the ratio of the two potentials, $V_1$ and $V_2$, applied and in part by the aberrations of the lens. The range of values for the voltage ratio, magnification and image distance needed to form a real or virtual image is described in detail in T. H. P. Chang et al., "Electron Optical Performance of a Scanning Tunnelling Microscope Controlled Field Emission Microlens System", *J. Vac. Sci. Tech.* B7(6), p. 1855, Nov./-Dec. 1989, which article is hereby incorporated by reference.

As shown in FIG. 4, the tip 22 can be positioned by an STM 32 to the center of a dual electrode immersion lens fabricated from silicon membranes. The STM 32 can be of the type described in more detail in U.S. Pat. No. 4,343,993, which patent is hereby incorporated by reference. FIG. 4 also shows the feedback amplifier 34 of STM 32 which uses either the emission current measured at tip 22, the transmitted current $I_t$, the first electrode current $I_a$, or a combination of these to provide the feedback signal. A Faraday cage 36 can be used to collect and measure the current that is transmitted $I_t$ through the apertures of electrodes 24 and 26. It can be added to the feedback amplifier 34 as shown in FIG. 4 to provide additional stabilization of the emission current. The STM feedback amplifier 34 is used for precision x, y and z alignment of tip 22 to the lens to form a STM-aligned field emission (SAFE) microsource. The STM 32 can accurately position the tip 22 relative to the first electrode 24 at a distance of the order of micrometers. The STM 32 is designed for ultrahigh vacuum use. The SAFE microsource 30 can be used for lithography, holography, microscopy, metrology, testing, inspection, recording and other electron beam applications.

The use of an STM provides several advantages. First, the tip can be fabricated separate from the microlens allowing freedom for the selection of tip materials, tip treatment, and tip shaping techniques, including the use of single atom tips. Secondly, the STM feedback amplifier 34 can be used to stabilize the emission current by automatically adjusting the Z position of the tip, providing both long-term emission stability and a reduction of noise. Thirdly, the tip can be positioned accurately in x, y and z directions to the center of the first electrode using STM imaging thereby improving positional stability thus making the use of an electrode diameter, electrode spacing and tip radius all in the micrometer range feasible. Furthermore, the low extraction voltage $V_1$ ($\approx 100$ V) sufficient for the microsource can significantly reduce the sputtering effects of ions bombarding the tip thereby reducing the spike noise.

The performance of electron gun 20 measured in brightness can be improved by reducing the lens aberrations. The three main aberrations are diffraction, spherical and chromatic. The last two are the main contributors to the effective brightness and are related to the geometry of the lens. As these aberrations scale with lens geometry, reductions in aberrations can be achieved by reducing the lens dimensions. For the electron gun 20, conventional scaling requires that $Z_o$ and the lens dimensions (electrode bore diameters and spacing) be uniformly reduced by the same scaling factor. In miniaturizing the lens dimensions, two practical constraints need to be considered. The minimum bore diameter for the electrodes 24 and 26 must be compatible with the tolerance of the microfabrication techniques employed. Taking 5 to 10 nm as the tolerance in edge roughness presently achievable using the best resist, electron beam lithography and RIE etching, a minimum bore diameter of approximately 1 $\mu$m is considered to be a practical limit. Since conventional lenses typically use a minimum bore diameter in the order of 1 mm, this constraint imposes a limit of scaling to approximately 1/1000. The second consideration is that the electric field between the electrodes must be restricted to a value not exceeding $10^4$ V/mm to avoid breakdown.

In the conventional uniform scaling approach for a lens, all the lens dimensions are uniformly reduced by a factor, k, from a conventional design to achieve a reduction of approximately the same factor k for the aberrations. However, this increases the electric field between the electrodes by a factor equal to the inverse of k. As many of the conventional lenses are designed fairly close to this field strength limit, very little room is left for scaling. Thus, for a small k value, the field can exceed the voltage breakdown threshold rendering the dimensions of the scaled structure impractical. This limitation applies to lenses used in conventional field emission sources as well as lenses used in a SAFE microsource.

To overcome this problem, the present invention utilizes a selective scaling method. In the selectively scaled approach of the present invention, a different scaling factor is applied to different parts of the lens to maintain the aberration reduction of the fully scaled case, while allowing a wide range of potentials, $V_2$, to be applied. More specifically, a strong factor of approximately 1/1000 applied to the critical areas which include the tip distance $Z_o$, the first electrode bore diameter $D_1$ and thickness $t_1$ and a weaker reduction factor, h, ranging from ⅓ to 1/300 is applied to the electrode spacing S and the second electrode bore diameter $D_2$. The weaker factor h allows the electrode spacing to take on larger values, and thus allows a wider range of potentials to be applied. The actual scaling factor h used for the electrode spacing can be chosen to meet the guideline on electric field strength. The thickness of the second electrode $t_2$ is not a critical parameter.

The selective scaling method of the present invention results in an improvement in aberration coefficients (spherical and chromatic) by approximately three orders of magnitude from a conventional source while allowing the same potential to be applied. The reduced aberrations lead to an improvement in effective brightness over a conventional field emission source of 2 to 3 orders of magnitude over a wide range of potentials. In addition, the present invention is compatible with the guidelines on minimum bore diameter and field strength between the electrodes.

There are many factors which contribute to the improvements resulting from the use of selective scaling. Qualitatively, the major lens action of the source takes place at the first electrode region. A reduced extraction voltage ($\approx 100$ V) generates low energy electrons which coupled with high field and field gradients in this region causes the bulk of the lens aberrations. The reduced geometry confines this region to the micrometer range thereby leading to low aberrations. The second electrode, typically being at a higher potential acts mainly as an accelerator for the electron and contributes little to the aberrations. Its position and diameter are, therefore, less critical.

To illustrate the selective scaling method of the present invention, the electron optical properties of a conventional field emission source and the selectively scaled microsource 30 have been analyzed. This involves potential calculations by the finite-element method and the use of paraxial trajectories and third-order aberration theory to determine the lens properties all of which are described in more detail in T. H. P. Chang et al., "Electron Optical Performance of a Scanning Tunnelling Microscope Controlled Field Emission Microlens System", *J. Vac. Sci. Tech.* B7(6), p. 1855, Nov./Dec. 1989. FIG. 2 shows the dimensions and computed aberration coefficients (referenced to the object space) of a high performance conventional field emission source at three potentials 200 V, 1 kV and 10 kV. As can be seen, these values are generally limited by the considerations discussed earlier to the millimeter range.

FIG. 5 shows the dimensions and computed aberration coefficients (referenced to the object space) of the selectively scaled SAFE microsource 30 at three potentials 200 V, 1 kV and 10 kV. As can be seen by comparing FIGS. 2 and 5, the critical parameters, $Z_o$, $D_1$ and $t_1$ have received a scaling factor from the conventional source of approximately 1/1000 to dimensions on the order of 1 micron, while the less critical parameters, S and $D_2$, received weaker but varying scaling factors ranging from approximately $\frac{1}{3}$ to 1/300 to dimensions of 10 μm to 1000 μm. The three orders of magnitude improvement in aberration coefficients for the microsource 30 over the entire range of selective scaling factors can readily be seen. The second electrode thickness $t_2$ can range from 1 to 100 μm. The particular value used for $t_2$ is not important because $t_2$ is not a critical parameter. It should be noted that the current computations do not include the space-charge and electron-electron interaction effects. Due to a much reduced path length in the microsource and the miniaturized column, the interaction effects are expected to be less than those in the conventional systems at comparable currents.

Figure 6:
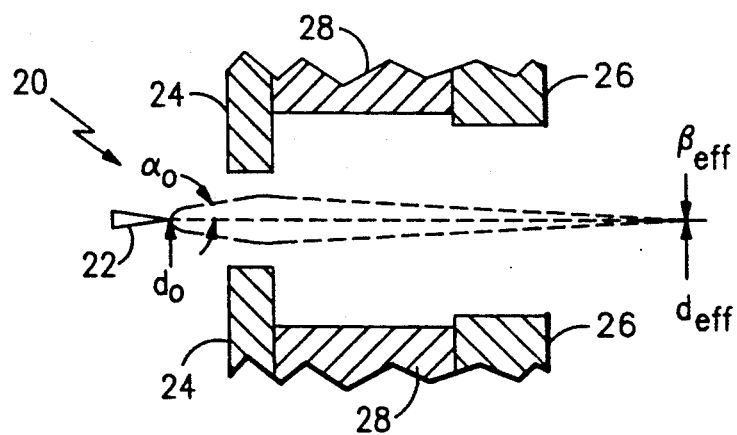
FIG. 6 is a cross-sectional view of the field emission electron gun in FIG. 3 showing the relationship of the effective brightness, semi-convergent angle, the effective source size and the virtual source size.

Using the aberration coefficient values in FIG. 2 for the conventional source and FIG. 5 for the selectively scaled microsource at the three potentials, 200 V, 1 kV and 10 kV, the effective brightness can be computed. The effective brightness ($\beta_{eff}$) is the brightness at the exit of the source with the aberrations of the source taken into consideration. The effective source size ($d_{eff}$) of the microsource can be expressed as $$d_{eff} = M (d_o^2 + d_d^2 + d_{so}^2 + d_{co}^2)^{\frac{1}{2}}$$

where M is the magnification of the microsource. $d_o$ is the size of the virtual source generated by the tip field. $d_d = 1.5/\alpha_o \sqrt{v_1}$ the diameter (in nm) of the diffraction disk with $V_1$, being the voltage (in volts) of the first electrode and $\alpha_o$ being the beam semiconvergent angle of the electron beam emitted from the tip. $d_{so} = 0.5 C_{so} \alpha_o^3$ is the spherical aberration disk with a spherical aberration coefficient $C_{so}$ referred to the object space. $d_{co} = C_{co} \alpha_o \Delta V/V_1$ is the chromatic aberration disk with a chromatic aberration coefficient $C_{co}$ also referred to the object space with $\Delta V$ being the energy spread of the electron beam. The effective brightness can be expressed as $$\beta_{eff} = \frac{dI}{d\Omega_0} / \frac{\pi}{4} (d_o^2 + d_d^2 + d_{so}^2 + d_{co}^2)$$

where $dI/d\Omega_o$ is the angular emission density of the tip. Since the aberrations depend on $\alpha_o$, $\beta_{eff}$ also depends on $\alpha_o$. The relationship between $\beta_{eff}$, $d_{eff}$, $d_o$ and $\alpha_o$ and the electron gun 20 are shown in FIG. 6.

Figure 7:
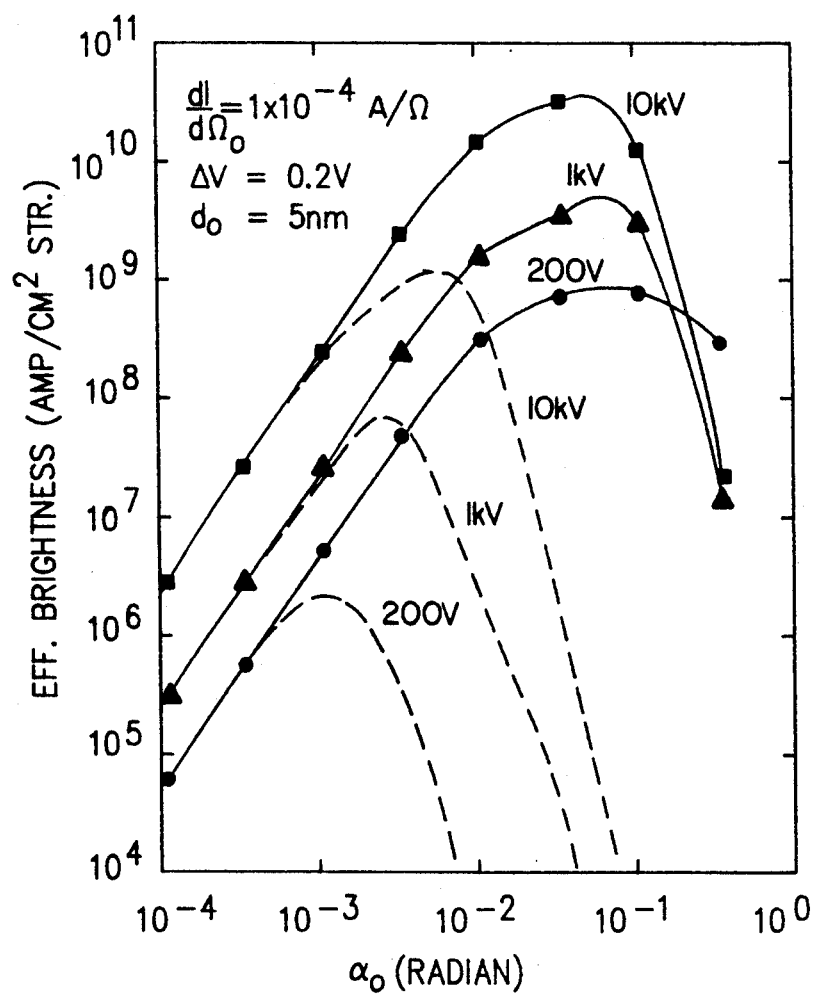
FIG. 7 is a graph of the effective brightness of the field emission electron gun of FIG. 4 (solid lines) and a conventional field emission source (dotted lines) plotted against the beam semi-convergent angle at three potentials.

The effective brightness for the conventional source (dotted lines) and selectively scaled microsource (solid lines) are plotted in FIG. 7 as a function of the semiconvergent angle $\alpha_o$. In FIG. 7, $\Delta V = 0.2$ V, $d_o = 5$ nm and $dI/d\Omega_o = 1 \times 10^{-4}$ A/Ω. At low values of $\alpha_o$, the diffraction effect dominates the performance yielding a relatively low effective brightness for both the conventional source and the microsource. As $\alpha_o$ increases, so does the effective brightness initially but it eventually begins to decline when the effects of the other aberrations (chromatic and spherical) start to exert themselves. The peak effective brightness is reached when the effective source size is at a minimum. The conventional source with much higher aberrations reaches its peak much earlier than the microsource for a given potential. Thus, at the three potentials shown, the microsource offers 2 to 3 orders of magnitude improvement in peak effective brightness over a conventional field emission source.

It will be understood by those skilled in the art that an additional two orders of magnitude improvement in effective brightness can be achieved by replacing tip 22 with a point source single atom tip which is described in H. W. Fink, *IBM J. Res. Dev.*, 50(5), 460 (1986), which article is hereby incorporated by reference.

A method for fabricating the electron gun 20 of the present invention will now be described below. The tip 22 can be a single crystal tungsten tip with <310> and <111> as the preferred directions. The tip 22 can be prepared using a standard DC electrochemical etch followed by annealing to remove surface oxides and other contaminates. This procedure will produce tips with a radius in the 20 nm to 50 nm range—a requirement for low extraction voltages. Alternatively, the tip 22, after etching, can be processed by a combination of thermal annealing and field evaporation in the presence of either He or Ne gas to reliably produce a clean atomically defined tip in trimer and other apex configurations. Such tips exhibit an exceptionally strong preferential emission lobe along the axis of the crystal, the angle of which is only a few degrees.

The microlenses consist mainly of planar electrodes that can be readily fabricated on silicon or other substrates using standard microfabrication techniques, although other fabrication methods can also be used. The electrodes can be fabricated from a thin self supporting metallic film or a boron doped silicon membrane having a thickness in the micrometer range (typically 2-3 μm). Silicon is the preferred material because of the abundance of techniques for micromachining silicon, the inherent mechanical strength of single crystal silicon, the ability to withstand high-field conditions and the conductivity of the boron doped surface. The membranes were covered with 250 nm of oxide by a low pressure chemical vapor deposition (LPCVD) process and spin-coated with a poly-methyl methacrylate (PMMA) resist. Precise circular holes were prepared in the membranes by first patterning in an electron beam lithography system and subsequently etching in an RIE. As patterned, the roundness of the holes was less than 1 nm for carefully calibrated exposures. Using the oxide as a mask for silicon and bromine based chemistry, better than 6:1 selectivity was obtained in the RIE with edge roughness on the order of 10 nm and only minimal undercut. Electrode thicknesses were fabricated by etching the backside of the membrane in a $CF_4/O_2$ gas mixture to the desired value, typically 1 μm for the first electrode 14.

While the invention has been particularly shown and described with respect to the illustrative and preferred embodiments thereof, it will be understood by those skilled in the art that the foregoing and other changes in form and details may be made therein without departing from the spirit and scope of the invention which should be limited only by the scope of the appended claims.

Having thus described the invention, what is claimed as new and what is desired to be secured by Letters Patent is:

1. A field emission electron gun comprising:
   a source of electrons;
   a first electrode having an aperture of a first diameter disposed therein and a first thickness approximately equal to said first diameter, said first electrode being spaced from said source by a distance approximately equal to said first diameter;
   a second electrode having an aperture of a second diameter substantially greater than said first diameter disposed therein and a second thickness, said second electrode being spaced from said first electrode by a distance substantially equal to the second diameter; and
   a dielectric layer sandwiched between said first electrode and said second electrode, said dielectric layer having an aperture of a third diameter greater than said second diameter.

2. The field emission electron gun of claim 1 wherein said source of electrons is a scanning tunneling microscope controlled field emission tip.

3. The field emission electron gun of claim 1 wherein said first diameter is approximately one micron.

4. The field emission electron gun of claim 1 wherein said second diameter is in the range of 10 to 1000 μm.

5. The field emission electron gun of claim 1 wherein said first diameter is approximately one micron and said second diameter is in the range of 10 to 1000 μm.

6. A field emission electron gun comprising:
   a source of electrons;
   a first electrode having an aperture of a first diameter disposed therein and a first thickness approximately equal to said first diameter, said first electrode being spaced from said source by a distance approximately equal to said first diameter, and having a first voltage between said first electrode and said source;
   a second electrode having an aperture of a second diameter substantially greater than said first diameter disposed therein and a second thickness, said second electrode being spaced from said first electrode by a distance substantially equal to the second diameter and having a second voltage between said first electrode and said second electrode, said second voltage increases as the second diameter increases; and
   a dielectric layer sandwiched between said first electrode and said second electrode, said dielectric layer having an aperture of a third diameter greater than said second diameter.

7. The field emission electron gun of claim 6 wherein said source of electrons is a scanning tunneling microscope controlled field emission tip.

8. The field emission electron gun of claim 6 wherein said first diameter is approximately one micron.

9. The field emission electron gun of claim 6 wherein said second diameter is in the range of 10 to 1000 μm.

10. The field emission electron gun of claim 6 wherein said first diameter is approximately one micron and said second diameter is in the range of 10 to 1000 μm.

11. The field emission electron gun of claim 10 wherein a sum of said first voltage and said second voltage is in the range of 200 to 10,000 volts.

12. The field emission electron gun of claim 11 wherein said first voltage is 100 volts.

13. The field emission electron gun of claim 6 wherein said first voltage is 100 volts.

14. The field emission electron gun of claim 13 wherein a sum of said first voltage and said second voltage is in the range of 200 to 10,000 volts.

* * * * *